Figure 1:
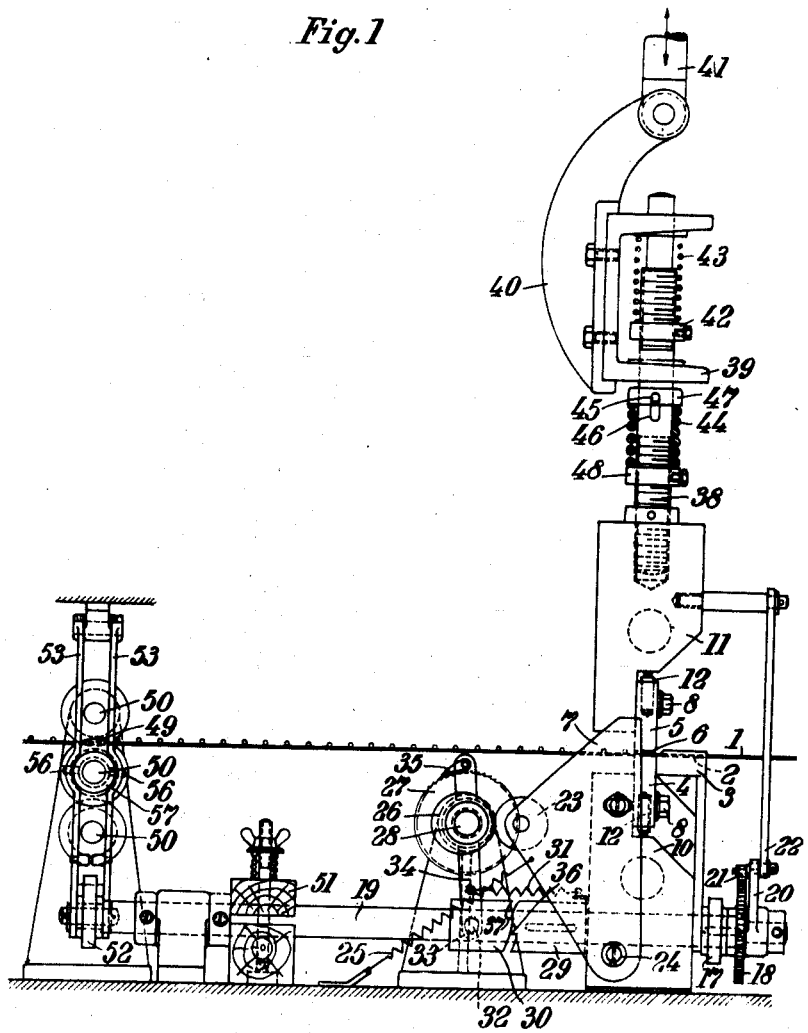

April 18, 1939.    W. KRÄMER    2,155,095
ELECTROWELDING OF WIRE NETTINGS
Filed Oct. 14, 1937    2 Sheets-Sheet 1

Inventor
WILHELM KRÄMER
by Walter S. Bleistein
ATTORNEY

Inventor:
WILHELM KRÄMER
by Walter S. Bleistein
ATTORNEY

Patented Apr. 18, 1939

2,155,095

UNITED STATES PATENT OFFICE 2,155,095

ELECTROWELDING OF WIRE NETTINGS

Wilhelm Krämer, Emmerich, Rhine, Germany

Application October 14, 1937, Serial No. 168,849
In Germany October 16, 1936

18 Claims. (Cl. 219—4)

The invention relates to the manufacture of of wire netting by means of electric resistance welding.

The object of the invention is to produce wire netting which is always uniform in respect to quality and appearance.

Heretofore, in the welding of wire netting, the adjacent crossing points in the direction of the transverse wires have been gripped and welded individually each by a separate electrode, or, particularly in the case of narrow-mesh netting, by a common electrode in bar form extending over the entire width of the strip of netting. Due to the very frequent and heavy mechanical stressing of the electrodes always at the same places, more or less considerable depressions are produced in the electrodes, especially since there is also a high welding heat. The consequence thereof is that after a short time all the crossing points are no longer welded together uniformly and the netting has bulges and bent places. It is thereby rendered useless for many purposes because it is no longer quite flat. As the wear of the electrodes progresses, welding of the crossing points is finally no longer possible. Consequently, the electrodes have to be filed and trued very frequently which involves considerable loss of valuable material and in addition much adjustment work.

This disadvantage may be eliminated according to the invention by the fact that after each welding or also always after a series of weldings, the position of the longitudinal wires relatively to the electrodes, or conversely, is altered in the transverse direction, and if necessary, the position of the new transverse wire to be welded in each case, relatively to the electrodes, or conversely, is altered in the longitudinal direction.

The machine adapted to carry out the process according to the invention may be provided with an eccentric disc or the like, by means of which the guide bar for the longitudinal wires may be reciprocated in the transverse direction relatively to the electrodes, or conversely.

Furthermore, according to the invention, such machine may be provided with a second eccentric disc or the like by means whereof the counterholders, against which the particular transverse wire to be welded is applied during its feed, are moved forward or backward in the longitudinal direction.

The movement of the netting during welding and hence the movement of the welded strip of netting makes it necessary to provide means for preventing the transverse wire cutters from cutting the longitudinal edge wires and also for preventing the ends of the severed transverse wires from projecting beyond the longitudinal edge wires.

For this purpose, the machine for carrying out the process according to the invention may be provided with a third eccentric disc or the like, by means of which the transverse wire cutters are reciprocated in the same rhythm and by the same amount as the longitudinal wires.

Electrodes which extend bar-like in one piece over the entire width of the netting have the disadvantage that considerable thermal expansion and consequently bent places are produced in them, whereby the manufacture of narrow mesh netting of very thin wires, for which individual electrodes are not applicable, is rendered very difficult and the manufacture of a satisfactory product may frequently become very doubtful.

This disadvantage is obviated according to the invention by sub-dividing the bar-like electrodes transversely to the strip of netting into partial electrode bars, and arranging the individual partial electrode bars to be vertically adjustable.

Figure 2:
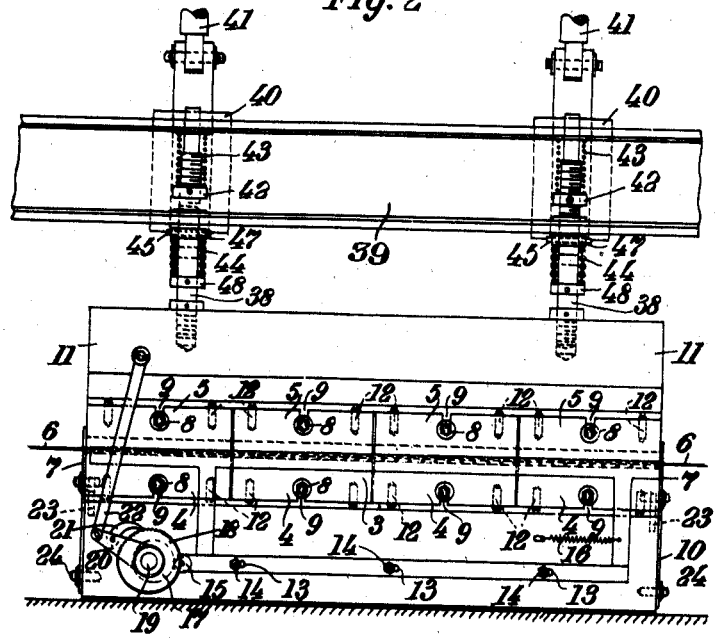
Figure 3:
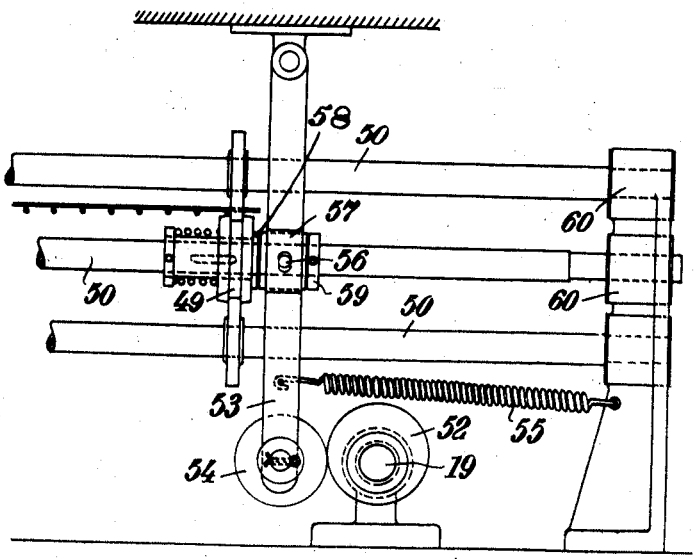

A machine according to the invention is shown by way of example in the accompanying drawings, wherein;

Figure 1 is a side view and
Figure 2 is a front view.
Figure 3 shows a rear view of the device for the lateral shifting of the transverse wire cutters.

The longitudinal wires 1 pass through holes 2 of a common guide bar 3 between the bar-like electrodes 4, 5, below the upper one of which the transverse wires 6 are passed. By means of two holding and clamping devices (not shown) provided laterally of the electrodes 4, 5, the transverse wires 6 are applied against counter-holders 7, which determine the exact position of the transverse wires 6 between the electrodes 4, 5 during the welding operation, and the form of which depends upon whether the transverse wires are fed from the front, from the side or in some other way.

In the constructional example, the electrodes 4, 5 each consist of four partial electrodes which, by means of screw bolts 8 passing through slots 9 of the electrodes, are secured laterally to supporting members 10, 11 and bear against the latter above or below by means of stud bolts 12. By correctly adjusting the stud bolts 12, it is possible to secure a uniform distance between the electrodes 4, 5 over the entire width of the netting and hence an equal pressure on all the wire crossings during welding. The subdivision of the electrodes has the advantage that the temperature difference occurring between the electrodes 4, 5 and their supports 10, 11 no longer causes bending of the short electrode sections, an advantage ensuring a uniform quality for the wire netting.

The guide bar 3 determining the position of the longitudinal wires 1 between the electrodes 4, 5 is made in the form of a frame and is adjustable in slots 13, relatively to bolts 14 of the machine frame, in the direction of the transverse wires 6. On one side of the guide bar frame is mounted a roller 15 which, under the tension of a spring 16 is constantly applied against an eccentric disc 17. The eccentric disc 17 together with a ratchet wheel 18 is secured to a shaft 19 which is journalled in the machine frame and on which in addition a lever 20 is rotatably mounted. Said lever 20 carries a pawl 21 engaging the ratchet wheel 18, and there is also pivoted to it a rod 22 secured to the upper electrode support 11.

During operation, the support 11 moves up and down. The rod 22 also participates in this reciprocatory movement, the lever 20 with pawl 21 rocking outward. The outward rocking of pawl 21 rotates the ratchet wheel 18 by one tooth on each stroke. The eccentric disc 17 is thereby also rotated a slight amount and moves the frame with the guide bar 3 somewhat to the left or to the right (seen in Figure 2) so that after each stroke of the upper electrode support 11, the longitudinal wires move in the direction of the transverse wires 6.

The magnitude of the lateral displacement is determined by the eccentricity of the disc 17. Upon each revolution of the disc 17, the crossing points travel once to the right and left by twice the amount of the eccentricity. In this way, the electrodes, as far as concerns their stressing by the longitudinal wires 1, are worn quite uniformly over the distance of the lateral displacement.

Due to the lateral movement of the crossing points, the longitudinal wires in the finished netting have a slightly sinuous form. The slower the netting is reciprocated, the less apparent is this sinuous form. The sinuous form may therefore be prevented to a considerable extent by connecting the rod 22 to a machine part which performs a stroke only after a certain number of strokes of the electrode support 11, instead of to the electrode support 11. The displacement of the longitudinal wires then only occurs after a number of successive weldings.

According to the invention, it is also possible to proceed so that it is not the guide bar 3 which continually reciprocates in the hereinbefore described manner, but the electrode supports 10, 11 with the electrodes 4, 5, or even only the electrodes 4, 5.

Each of the two counter-holders 7 is provided with a roller 23 and is adapted to rock about a bolt 24. The rollers 23 are constantly pulled by springs 25 against eccentric discs 26 which, together with a ratchet wheel 27, are secured to a shaft 28. Fast on the shaft 19 is a sleeve 29, against which a sleeve 30, loose on shaft 19, is applied under the pull of a spring 31. Engaging two studs 32 of the sleeve 30 by means of slots 33 is a lever 34 which is loosely mounted on shaft 28 and carried at its upper end is a ratchet pawl 35 engaging the ratchet wheel 27. The adjacent end faces of the sleeves 29, 30 are provided with bevelled claws 36, 37 (after the fashion of a claw coupling), so that, upon each revolution of the shaft 19, the sleeve 30 performs a reciprocatory movement in the direction of the axis of the shaft 19 and the lever 34 performs a rocking movement, during which the ratchet wheel 27 is rotated further by one tooth by the ratchet pawl 35. The number of claws 36, 37 on the sleeves 29 and 30 determines the number of rocking movements of the lever 34 during one revolution of the shaft 19, and hence the number of times the ratchet wheel 27 is advanced by one tooth during one revolution of the shaft 19.

Upon the rotation of the ratchet wheel 27, the shaft 28 and the eccentric discs 26 also rotate, the counter-holders 7 being rocked about the bolts 24. Since the counter-holders 7 determine the position of transverse wires 6 between the electrodes 4, 5, the transverse wires 6 are shifted forward or backward (seen in the working direction of the machine) by a small amount upon each stroke of the lever 34. The eccentric discs 26 are of such a shape that while they are making one revolution, the transverse wires 6 are shifted forward and backward quite uniformly. In this way, during welding, the electrodes 4, 5 are worn quite uniformly as regards their stressing by the transverse wires 6.

Due to the step described displacement of the welding points relatively to the electrodes is effected and depressions are no longer formed in the electrodes. Almost the entire work of adjustment is eliminated, and the quality of the netting produced always remains the same.

In the constructional example, the machine operates in such a manner that during one revolution of the eccentric disc 17 and hence of the shaft 19, the longitudinal wires 1 are reciprocated by one mesh width. At the end of such a reciprocatory movement that is to say after one revolution of the shaft 19, the transverse wire is thus displaced a small amount. Of course, it is also possible to proceed so that first the longitudinal wires 1 are moved once until the entire free disengaged mesh width has been utilized, and that then a displacement of the transverse wire 6 by a small amount is effected. This displacement of the transverse wire is repeated as soon as the longitudinal wires 1 have returned over the disengaged mesh width. This is effected by providing two claws 36, 37 on each of the sleeves 29, 30.

The upper electrode support 11 is carried by screw-bolts 38 adapted to slide upwardly and downwardly in a channel rail 39. The rail 39 is moved upwardly and downwardly by means of holders 40 and rods 41 by cranks or eccentrics (not shown). Adjustably secured to each screw bolt 38 is a ring 42 against which there presses a weak spring 43 bearing against the upper flange of the rail 39. Upon the upward movement of the rail 39, the lower flange thereof abuts against the ring 42, the position of which thus determines the instant at which the upper electrode 5 comes into contact with the wire crossings or is lifted off the welded places. A powerful pressure spring 44 presses upwardly against a ring 47 guided by a pin 45 in a slot 46 of the bolt 38, and downwardly against a ring 48 adjustable on the bolt 38.

Upon the downward movement of the rail 39, the electrode 5 comes into contact with the transverse wire 6 stretched above the longitudinal wires 1. The weight of the electrode support 11 and the pressure of the spring 43 provide the necessary pressure of application for the crossing points. As soon as the transverse wire 6 lies firmly on the longitudinal wires 1 between the electrode elements 4, 5, the welding current is switched on. Due to their being only slight pressure at first a considerable electrical resistance is set up between the longitudinal and transverse wires. The material to be welded is thereby brought to welding heat very rapidly but only a very small spot. When welding heat has been attained, the rail 39 is applied to the ring 47 and compresses the spring 44. The material to be welded is in this way compressed with a powerful pressure supplied by the springs 43 and 44, and also the weight of the electrode support 11, and a deep and intimate weld is obtained, the welding heat being rapidly removed from the wires. The welds thus made are scarcely visible.

The additional upsetting pressure supplied by the spring 44 may of course be produced in some other suitable manner, for example by means of a weight designed for the purpose.

Due to the uniform continuous displacement of the longitudinal wires 1 between the electrodes 4, 5 the finished welded netting of course reciprocates continuously between the electrodes 4, 5 as it passes through the machine. This lateral reciprocation of the netting, however, makes it necessary that the two cutter sets 49, the function of which is to sever the ends of the transverse wires 6 projecting beyond the longitudinal edge wires 1, should be arranged as far from the longitudinal edge wires as corresponds to the lateral displacement of the netting. This of course results in very long projecting transverse wire ends. In order to ensure a smooth netting edge in any case, it is necessary to cause the cutter sets 49 mounted on three shafts 50 to perform a lateral movement in the same rhythm and by the same amount as the longitudinal wires 1. This is effected by the fact that the shaft 19, which is extended to the cutter sets 49, and for preventing unwanted forward and backward movement of which, a jaw type brake 51 is provided, carries on the outermost end an eccentric disc 52, against which a roller 54 mounted on a rocking lever 53 is pulled by a spring 55. Engaging the rocking lever 53 are studs 56 of a slide ring 57 guided between two rings 58, 59 fast on the central shaft 50. The central shaft 50, on which the central wheel of the cutter set 49 is fast, is adapted to reciprocate in its bearings 60, while the upper cutter of the cutter set 49 and the lower guide disc for the central cutter are loose on their respective shafts 50, which in their turn are not adapted to slide in the bearing 60.

The rotation of the shaft 19 also rotates the eccentric disc 52. The lever 54 thereby rocks outwardly and, since the eccentric discs 17 and 52 have the same eccentricity, to the same extent as the longitudinal wires 1 are displaced laterally. Of course, the two eccentric discs 17 and 52 must be brought into the correct position relatively to one another.

In this way the cutter sets 49 are obliged to participate in the lateral movement of the finished netting, whereby it is possible to obtain always smooth netting edges.

Instead of the eccentric discs 17, 26 and 52 it is possible to employ cranks or the like.

I claim:

1. In a method of making welded nettings of longitudinal and transverse wires with the aid of welding electrodes the steps of operation which comprise causing a stepwise advancement of the longitudinal wires in their longitudinal direction relative to the electrodes, causing a stepwise and reciprocating relative movement between said electrodes and said longitudinal wires in a transverse direction, said transverse movement being so timed that its steps substantially coincide with steps of the advancement, feeding successively transverse wires to the place of welding, said feeding being so timed that a transverse wire is present at the place of welding in each interval between two successive steps of advancement of the longitudinal wires, and applying the welding electrodes in the intervals between the steps of advancement.

2. In a method of making welded nettings of longitudinal and transverse wires with the aid of bar-like welding electrodes, the steps of operation which comprise causing a stepwise advancement of the longitudinal wires in their longitudinal direction relative to the electrodes, feeding successively transverse wires to the place of welding, said feeding being so timed that a transverse wire is present at the place of welding in each interval between two successive steps of advancement of the longitudinal wires, applying the electrodes in the intervals between the steps of advancement of the longitudinal wires, and varying the place to which the transverse wires are fed to be welded, relatively to the electrodes in the longitudinal direction of the longitudinal wires, after a predetermined number of transverse wires has been welded to the longitudinal wires.

3. A method as claimed in claim 1 in which the place to which the transverse wires are fed to be welded is varied relatively to the electrodes in the longitudinal direction of the longitudinal wires after a predetermined number of transverse wires has been welded to the longitudinal wires.

4. In a machine for welding nettings of longitudinal and transverse wires, the combination of an elongated electrode arranged transversely of the longitudinal wires of a netting to be welded, means for guiding said longitudinal wires parallel and in spaced relation to each other, and at substantially right angles to said electrode, and means for causing a reciprocating relative movement of said electrodes and said guiding means in the transverse direction.

5. In a machine for welding nettings of longitudinal and transverse wires, the combination of an elongated electrode arranged transversely of the longitudinal wires of a netting to be welded, means for guiding said longitudinal wires parallel and in spaced relation to each other, and at substantially right angles to said electrode, and means for causing a reciprocating relative movement of said electrode and said guiding means in the transverse direction, and means for timing said relative movement in relation to the advancement of said longitudinal wires.

6. In a machine for welding nettings of longitudinal and transverse wires, the combination of lower and upper electrodes, arranged transversely of the longitudinal wires of the netting to be welded, at least one of said electrodes being adapted to reciprocate relatively to the other one, guiding means for guiding said longitudinal wires parallel and in spaced relation to each other, and at substantially right angles to said electrodes, and a drive controlled in dependence on the strokes of said movable electrode for causing a reciprocating relative movement of said electrodes and said guiding means in a transverse direction.

7. In a machine for welding nettings of longitudinal and transverse wires, the combination of lower and upper electrodes arranged transversely of the longitudinal wires of a netting to be welded, at least one of said electrodes being adapted to reciprocate relatively to the other one, guiding means for guiding said longitudinal wires parallel and in spaced relation to each other and at substantially right angles to said electrodes, an eccentric for causing a reciprocating movement of said guiding means in the transverse direction, and a drive in operative connection with said movable electrode for rotating said eccentric.

8. In a machine for welding nettings of longitudinal and transverse wires, the combination of lower and upper electrodes arranged transversely of the longitudinal wires of a netting to be welded, at least one of said electrodes being adapted to reciprocate relative to the other one, a guide bar for guiding said longitudinal wires parallel and in spaced relation to each other and at substantially right angles to said electrodes, said guide bar being arranged substantially parallel to said electrodes, an eccentric for reciprocating said guide bar in the transverse direction, a pawl and ratchet wheel drive in operative connection with said movable electrode for rotating said eccentric stepwise and in dependence on the strokes of said movable electrode.

9. In a machine for welding nettings of longitudinal and transverse wires, the combination of elongated upper and lower electrodes arranged transversely of the longitudinal wires of a netting to be welded, means for guiding said longitudinal wires parallel and in spaced relation to each other and at substantially right angles to said electrodes, holding means for holding a transverse wire in position for welding relatively to said electrodes, and means for varying the relative position of said holding means and said electrodes in the longitudinal direction.

10. In a machine for welding nettings of longitudinal and transverse wires, the combination of elongated upper and lower electrodes arranged transversely of the longitudinal wires of a netting to be welded, means for guiding said longitudinal wires parallel and in spaced relation to each other and at substantially right angles to said electrodes, means for causing a reciprocating relative movement of said electrodes and said guiding means in a transverse direction, holding means for holding a transverse wire in position for welding relatively to said electrodes, and means for varying the relative position of said holding means and said electrodes in the longitudinal direction.

11. In a machine for welding nettings of longitudinal and transverse wires, the combination of elongated upper and lower electrodes arranged transversely of the longitudinal wires of the netting to be welded, at least one of said electrodes being adapted to reciprocate relatively to the other one, means for guiding said longitudinal wires parallel and in spaced relation to each other and at substantially right angles to said electrodes, movable holding means for holding a transverse wire in position for welding relatively to said electrodes, and a drive controlled in dependence on the strokes of said movable electrode for varying the relative position of said holding means and said electrodes in the longitudinal direction.

12. In a machine for welding nettings of longitudinal and transverse wires, the combination of elongated upper and lower electrodes arranged transversely of the longitudinal wires of a netting to be welded, at least one of said electrodes being adapted to reciprocate relatively to the other one, guiding means for guiding said longitudinal wires parallel and in spaced relation to each other and at substantially right angles to said electrodes, movable holding means for holding a transverse wire in position for welding relatively to said electrodes, an eccentric for causing a reciprocating movement of said holding means in the longitudinal direction, a pawl and ratchet wheel drive for rotating said eccentric stepwise, and an operative connection between said drive and said movable electrode for operating said drive in dependence on the strokes of said movable electrode.

13. In a machine for welding nettings of longitudinal and transverse wires, the combination of lower and upper electrodes arranged transversely of the longitudinal wires of a netting to be welded, guiding means for guiding said longitudinal wires parallel and in spaced relation to each other and at substantially right angles to said electrodes, a drive for causing a reciprocating relative movement of said electrodes and said guiding means in a transverse direction, cutting means laterally of the outermost longitudinal wires for cutting the ends of the transverse wires, and means for moving said cutting means transversely in rhythm with the reciprocating relative movement of said electrodes and said guiding means.

14. In a machine for welding nettings of longitudinal and transverse wires, the combination of elongated lower and upper electrodes arranged transversely of the longitudinal wires of a netting to be welded, at least one of said electrodes being adapted to reciprocate relatively to the other one, means for guiding said longitudinal wires parallel and in spaced relation to each other and at substantially right angles to said electrodes, a drive controlled in dependence on the strokes of said movable electrode for causing a reciprocating relative movement of said electrodes and said guiding means in a transverse direction, cutting means laterally of the outermost longitudinal wires for cutting the ends of the transverse wires, an eccentric for reciprocating said cutting means in the transverse direction, a pawl and ratchet wheel drive in operative connection with said movable electrode for rotating said eccentric stepwise and in dependence on the strokes of said movable electrode.

15. In a machine for welding nettings of longitudinal and transverse wires, the combination of lower and upper electrodes arranged transversely of the longitudinal wires of a netting to be welded, at least one of said electrodes being adapted to reciprocate relatively to the other one, guiding means for guiding said longitudinal wires parallel and in spaced relation to each other and at substantially right angles to said electrodes, cutting means laterally of the outermost longitudinal wires for cutting the ends of the transverse wires, a shaft, a first eccentric on said shaft for reciprocating said guiding means in the transverse direction, a second eccentric on said shaft for reciprocating said cutting means in the transverse direction, a pawl and a ratchet wheel drive in operative connection with said movable electrode for rotating said shaft stepwise and in dependence on the strokes of said movable electrode.

16. In a machine for welding nettings of longitudinal and transverse wires, the combination of lower and upper electrodes arranged transversely of the longitudinal wires of a netting to be welded, at least one of said electrodes being adapted to reciprocate relatively to the other one, guiding means for guiding said longitudinal wires parallel and in spaced relation to each other and at substantially right angles to said electrodes, holding means for holding a transverse wire in position for welding relatively to said electrodes, a shaft, a first eccentric on said shaft for reciprocating said guiding means in the transverse direction, a pawl and ratchet wheel drive in operative connection with said movable electrode for rotating said shaft stepwise in dependence of the strokes of said movable electrode, a second eccentric for reciprocating said holding means in the longitudinal direction, a second pawl and ratchet wheel drive for rotating said second eccentric stepwise, and means on said shaft for operating said second pawl and ratchet wheel drive upon rotation of said shaft.

17. In a machine for welding nettings of longitudinal and transverse wires, the combination of elongated upper and lower electrodes arranged transversely of the longitudinal wires of the netting to be welded, each of said electrodes comprising a plurality of contact sections in an aligned arrangement, and each of said upper contact sections being in cooperative relation to one of said lower contact sections, a first common means for carrying said upper contact sections, a second common means for carrying said lower contact sections, means for reciprocating one of said common means relatively to the other one in a direction perpendicular to the plane of netting to be made, and individual means for adjusting each contact section relatively to said means by which it is carried.

18. In a machine for welding nettings of longitudinal and transverse wires, the combination of elongated upper and lower electrodes arranged transversely of the longitudinal wires of the netting to be welded, each of the electrodes comprising a plurality of contact sections in an aligned arrangement, said contact sections being individually adjustable in a direction at right angles to the plane of the longitudinal wires, common means for reciprocating the contact sections of one of the electrodes relatively to the other one, means for guiding said longitudinal wires parallel and in spaced relation to each other and at substantially right angles to said electrodes, and a drive in operative connection with said common means for causing a reciprocating relative movement of said guiding means in a transverse direction.

WILHELM KRÄMER.